United States Patent [19]

Lough et al.

[11] 4,175,936
[45] Nov. 27, 1979

[54] DIFFUSER WITH REPLACEABLE FILTER

[75] Inventors: Wendell J. Lough; Donald E. Bishop, both of Hampstead, N.H.

[73] Assignee: Weber Technical Products Division of Craig Systems Corp., Lawrence, Mass.

[21] Appl. No.: 830,658

[22] Filed: Sep. 6, 1977

[51] Int. Cl.² .............................................. B01D 35/02
[52] U.S. Cl. ............................... 55/385 A; 55/413;
55/502; 55/504; 55/505; 55/511; 55/DIG. 29;
98/36; 98/40 D
[58] Field of Search ................. 55/385 R, 385 A, 478,
55/480, 483, 484, 494, 499, 501, 502, 504, 505,
DIG. 29, 511; 98/36, 40 D; 160/392, 391;
248/261, 262

[56] References Cited

U.S. PATENT DOCUMENTS

| 2,252,724 | 8/1941 | Myers ............................ 55/502 |
| 3,247,652 | 4/1966 | Annas et al. .................... 55/481 |
| 3,380,507 | 4/1968 | Bontrager ..................... 160/392 X |
| 3,465,666 | 9/1969 | Knab ............................ 55/484 X |
| 3,780,503 | 12/1973 | Smith .......................... 55/502 X |
| 3,788,046 | 1/1974 | Kaeppler et al. ................ 55/341 |
| 3,870,490 | 3/1975 | Landy ........................... 55/355 |
| 3,986,850 | 10/1976 | Wilcox ........................ 55/484 X |
| 4,034,659 | 7/1977 | Raider ..................... 55/DIG. 29 X |

FOREIGN PATENT DOCUMENTS 2293126  6/1976  France ................................. 55/385 A

*Primary Examiner*—Kathleen J. Prunner
*Attorney, Agent, or Firm*—Price, Heneveld, Huizenga & Cooper

[57] ABSTRACT

A diffuser of the type used in supplying filtered air to a clean work area includes a filter housing within which is supported a filter panel. Gaskets are carried on the upper and lower peripheral surfaces of the panel and an adjustable, resilient clamp operably engages the filter and biases the filter and the upper gasket to form a knife edge seal with a portion of the filter housing. A protective grill assembly is sealingly latched to the housing and also forms a knife seal with the lower gasket on the filter panel. Further, a curtain support member is disclosed which is carried by the grill assembly and seals an isolation curtain airtight to the ceiling.

16 Claims, 11 Drawing Figures

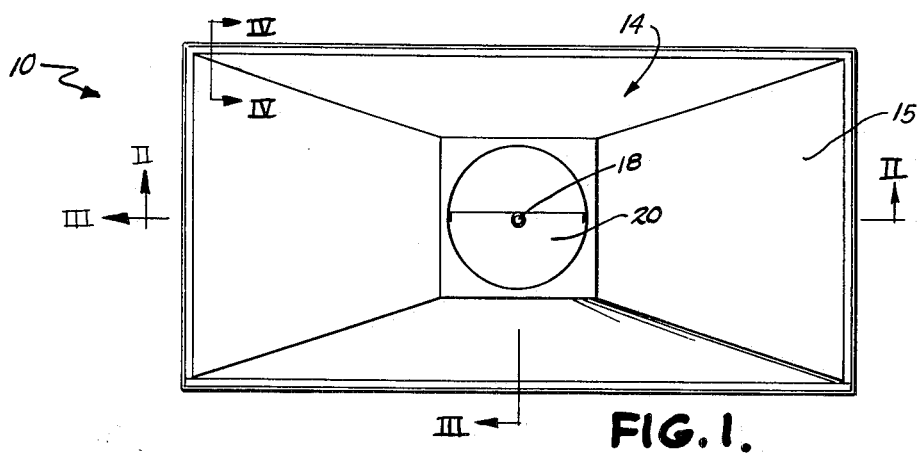
FIG. 1.
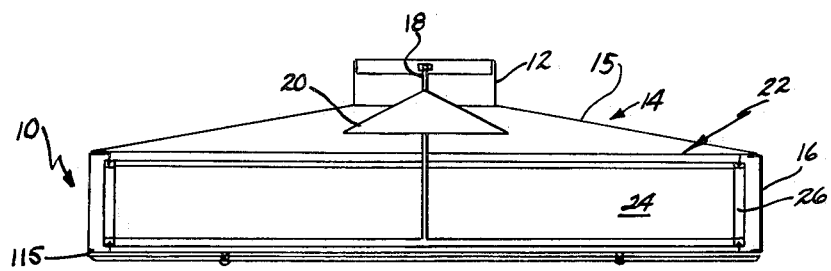
FIG. 2.
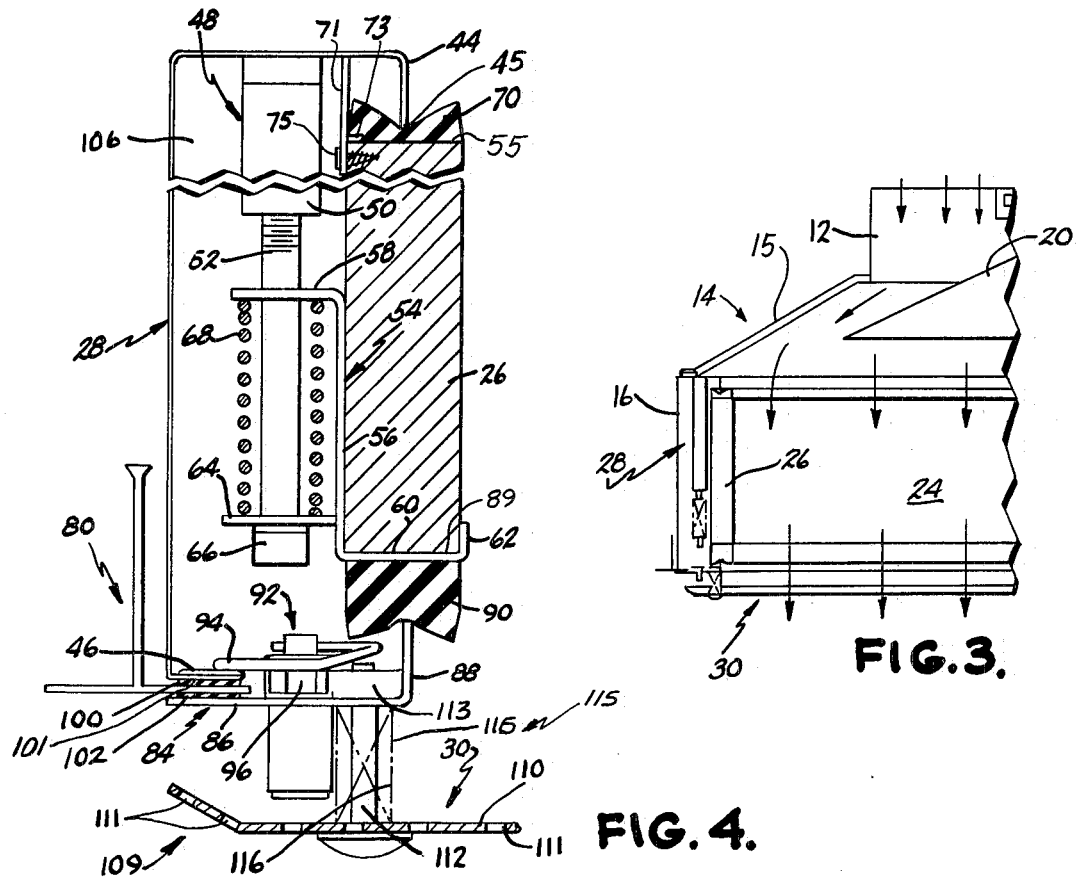
FIG. 3.
FIG. 4.

DIFFUSER WITH REPLACEABLE FILTER

BACKGROUND OF THE INVENTION

The present invention relates to clean rooms and more particularly to air diffusers and filter units supportable on a ceiling gridwork over a clean work area.

In the manufacture of electronic components, the production of certain pharmaceutical agents or compounds and in the performance of certain medical surgery, it is necessary or desirable to control the temperature, humidity and dust conditions of the air within the room or in the work area. In one example of clean room construction, the ceiling of the particular room or work area is formed with a plurality of side-by-side air filtration or diffuser units. Each of the units includes a hood or air plenum and a high efficiency filter. The unit is supported upon an inverted T-bar type ceiling gridwork. The filters employed in such units are HEPA filters. These filters ordinarily have particle efficiencies exceeding 99.97% for 0.3 micron diameter particles as determined by the Army Chemical Corp. D.O.P. Test.

The diffuser units are usually prefabricated at a manufacturing facility prior to actual installation at the job site. Once installed on the ceiling support gridwork, the diffusers are connected to elongated supply ducts which supply compressed air to the units. An example of one such clean room facility may be found in U.S. Pat. No. 3,323,437, entitled FILTER SYSTEM, and issued to J. V. Knab on June 6, 1967. The diffuser or plenum unit disclosed in the aforementioned U.S. Patent includes a filter receptacle within which is supported the filter medium. The filter is preferably permanently sealed into the filter receptacle by means of a suitable sealant such as silicon construction cement.

In certain applications, it has been found undesirable to employ a diffuser unit including a permanently installed filter element. Such diffuser units are essentially "throw away" units and when replaced require disassembly of the ceiling. During such disassembly, contaminants may be introduced into the area above the ceiling. Also, such replacement may be difficult, time-consuming and fairly expensive.

Therefore, it is highly desirable to employ a diffuser unit having a replaceable filter panel or filter element. Examples of various replaceable filter mounting arrangements may be found in U.S. Pat. No. 3,247,652, entitled MEANS FOR MOUNTING FILTER UNITS IN AIR DUCTS, issued on Apr. 26, 1966 to H. C. Annas et al; U.S. Pat. No. 3,740,934, entitled AIR FILTERING UNIT INCLUDING A CLAMPING ASSEMBLY, issued on June 26, 1973 to B. R. Shuler; U.S. Pat. No. 3,780,503, entitled LOW PROFILE FILTER SYSTEM, issued on Dec. 25, 1973 to I. M. Smith; U.S. Pat. No. 3,788,046, entitled APPARATUS FOR FILTERING GASES HAVING A MOVABLE FILTER BAG UNIT, issued on Jan. 29, 1974 to Kaeppler et al; and U.S. Pat. No. 3,870,490, entitled FILTER AND SEAL, issued on Mar. 11, 1975 to Jerome J. Landy.

In certain applications, however, especially those relating to pharmaceutical production, the area around the HEPA filter within the filter housing may become contaminated with the product being manufactured due to the aspirating effect of the air leaving the filter. To prevent such an effect, a complete seal must be provided around the filter panel. Such a seal is not accomplished by heretofore available units in a sample, easily employed manner. Also, unless the filter housing is effectively sealed, contamination may be introduced into the clean room environment from above the ceiling.

In pharmaceutical production, the diffuser units may be positioned over only one production area in the plant. Problems are then experienced with keeping the ordinary plant air out of the clean air area. Commonly, the work area is isolated with plastic curtains. Typically, these are attached to the ceiling and run completely around the filter diffusers dropping within a few inches of the floor. Typical installations only provide a curtain/ceiling fit or seal which permits contaminated or dirty air in the surrounding area to be aspirated into the clean air area at the ceiling.

Further, it has been found that when hoods or diffuser units are employed only in limited locations, and to screen out contaminants in a conditioning air system in a hospital room, for example, problems may be experienced when there is a high heat load in the controlled space. Due to the basically laminar flow air pattern from the diffuser, these units produce a vertical shaft of cool air extending from the ceiling to the floor. When the conditioned and filtered air is considerably cooler than the room air, the air shaft has an even stronger tendency to move directly to the floor. One manner of preventing this phenomenon is to provide a larger supply air volume at a lower temperature difference and increase the number of diffuser units employed above that are necessary for cleanliness alone. This, of course, is a fairly expensive way to solve the problem.

SUMMARY OF THE INVENTION

A need exists for a diffuser unit supportable on a ceiling gridwork and incorporating a replaceable filter panel which is effectively sealed around the annulus defined by the filter and the housing and which is easily and relatively inexpensively manufactured, assembled and disassembled. A need exists for an isolation curtain support for a diffuser effectively preventing aspiration of unfiltered air into a clean work area. Further, a need exists for a radial distributor for a diffuser which prevents vertical shafts of cool air.

In accordance with the present invention, an improved diffuser unit including a unique protective grill assembly, a replaceable filter mount and an isolation curtain support is provided whereby the problems heretofore experienced relating to effective sealing, ease of use and assembly and relative cost of manufacture are substantially eliminated. Essentially, the improved diffuser unit includes a filter housing dimensioned to rest on a ceiling support gridwork and within which is supported a filter panel. First and second sealing gaskets extend around the upper and lower peripheral surfaces of the filter panel, respectively, and resilient, support clamping means carried by the filter housing, support the filter panel within the housing and bias the first gasket into engagement with a portion of the housing to define a knife edge seal. A grill means is provided which engages the filter housing, clamps and seals the housing to the ceiling support gridwork and defines with the second sealing gasket a knife edge seal.

In narrower aspects of the invention, provision is made for supporting an isolation curtain from the grill means so that an effective seal is formed to prevent aspiration of unconditioned air into the clean work area and a radial distributor is provided for effectively mixing the air leaving the diffuser.

BRIEF DESCRIPTION OF THE DRAWINGS

FIG. 1 is a top, plan view of an improved, diffuser unit in accordance with the present invention;

FIG. 2 is a cross-sectional view taken generally along line II—II of FIG. 1;

FIG. 3 is a fragmentary, cross-sectional view taken generally along line III—III of FIG. 1;

FIG. 4 is an enlarged, fragmentary, sectional view taken along line IV—IV of FIG. 1 showing the improved filter sealing and support means incorporated in the present invention;

DETAILED DESCRIPTION OF THE PREFERRED EMBODIMENT

Figure 5:
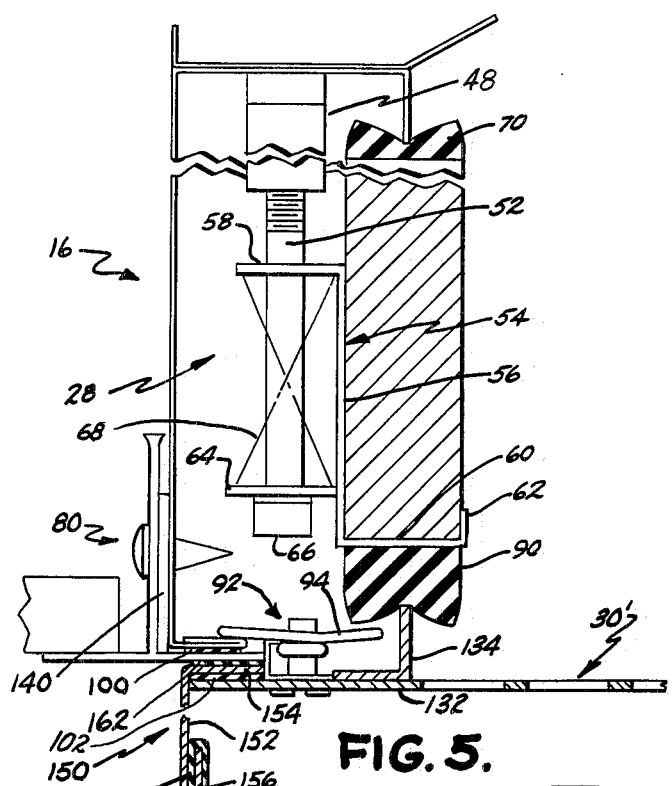
FIG. 5 is an enlarged, fragmentary, cross-sectional view of an alternative grill assembly.

The preferred embodiment of the unique diffuser unit in accordance with the present invention is illustrated in the drawings and generally designated 10. As shown in FIGS. 1 and 2, the diffuser unit 10 includes a plenum or downwardly opening hood 14 having a stack 12 connectable to a suitable air duct (not shown), a downwardly and outwardly diverging section 15 and a filter housing 16. Supported within the diverging section 15 on a suitable rod 18 is a bivalve damper 20. A more detailed description of this basic structure may be found in the aforementioned U.S. Pat. No. 3,323,437.

Supported within the filter housing 16 in a manner herein to be described in detail, is a conventional, framed, filter panel 22. The filter panel includes a HEPA filter 24 and a wood or other suitable frame 26. The filter 22, as seen in FIG. 3, is supported within the housing 16 by a resilient support and clamping means 28 and a unique, protective grill means 30.

Figure 9:
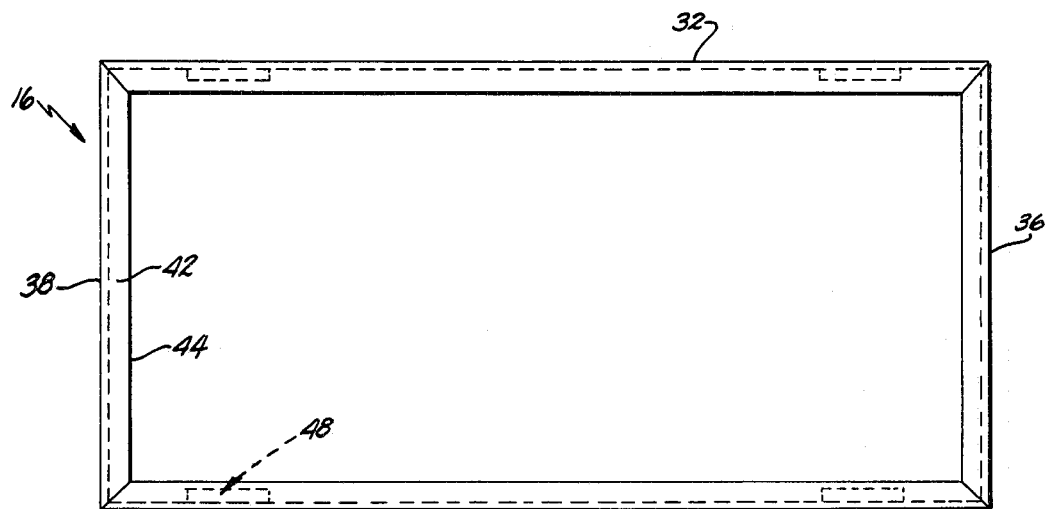
FIG. 9 is a top, plan view of the filter housing included in the diffuser unit.
Figure 10:
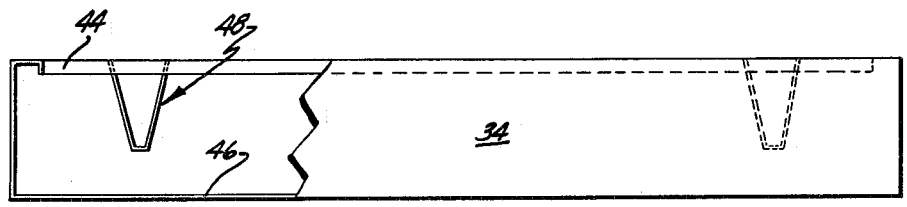
FIG. 10 is a fragmentary, partially sectioned, side view of the filter unit.
Figure 11:
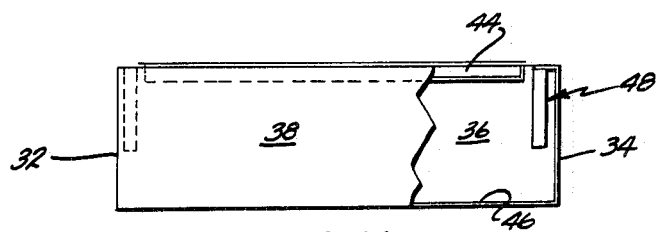
FIG. 11 is a fragmentary, partially sectioned end view of the filter housing.

In the presently preferred construction, the filter housing 16 is fabricated from sheet metal as a unit separate from the diverging portion 15 of the unit 10. As best seen in FIGS. 9, 10 and 11, the filter housing 16 includes sidewalls 32, 34, joined by end walls 36, 38. The housing 16 includes a continuous, peripheral, horizontal, inwardly directed upper flange 42. Connected to and extending downwardly generally vertical to the sidewalls and end walls and spaced therefrom is a downturned lip, skirt or vertical flange 44. The filter housing also includes a lower, horizontal, inwardly directed flange 46 extending around the lower periphery of the sidewalls and end walls and connected thereto. Welded or otherwise suitably secured to the undersurface of the upper horizontal flange 42 are a plurality of truncated V-shaped brackets or bracket straps 48 which will be more fully described below.

As seen either in FIG. 4 or FIG. 5, the filter panel 22 is clamped along its entire upper peripheral surface by resilient support and clamping means 28 carried by the brackets 48. The brackets 48 have threaded apertures at their ends 50 and receive an elongated rod 52. The rod 52 is threaded at one end within the threaded aperture at the end 50 of the bracket 48 and is therefore axially adjustable. An Allen head cap screw may be employed for the rod 52. An angled support bracket 54 includes a vertical portion 56 and upper and lower horizontal portions 58 and 60, respectively. The free end of portion 60 is turned upwardly to define a vertical lip 62. The support bracket 54 is dimensioned to support the frame 26 of the filter panel. Horizontal portion 58 of the bracket is apertured and the rod 52 extends therethrough. A washer 64 is disposed on the cap screw and abuts the head 66. A coil spring 68, schematically illustrated, is disposed between the washer 64 and the undersurface of the horizontal portion 58 of support bracket 54. Extending around the entire periphery of upper surface 55 of the filter frame 26 is a resilient gasket strip 70. The spring 68 due to its stop against washer 64 biases the bracket 54 and the filter panel 26 upwardly so that the resilient gasket 70 engages the edge 45 of the downturned lip or vertical flange 44 of the housing to define an effective, knife edge seal. The gasket material is compressed along the edge 45 of the downturned lip or skirt 44 throughout its entire length.

A plurality of stops 71 (FIG. 4) are preferably secured to the filter frame 26 adjacent the corners thereof to limit upward movement of the filter panel. The stops prevent over compression of the seal 70. This simplifies installation in the field and insures that an adequate seal is achieved without damage to the seal material. The stops 71 may be stamped and include a positioning tab 73. The stops are secured by screws 75.

When the diffuser unit 10 is installed in a ceiling, it is supported on a ceiling gridwork which may be of the inverted "T" bar type including support bars 80, as seen in FIGS. 4 and 5. In order to effectively seal the space above the ceiling from the clean area and to prevent contamination of the space above the ceiling and/or the dead air space between the side and end walls of the filter housing and the filter panel, the housing 16 is clamped and sealed to the ceiling gridwork 80. The area enclosed by the lower peripheral surface of the filter frame 26 and the bottom of the filter housing is closed off and sealed by the protective grill assembly or locking and sealing means 30 illustrated in FIGS. 3 and 4 or the protective grill assembly 30' illustrated in FIGS. 5–8.

Figure 8:
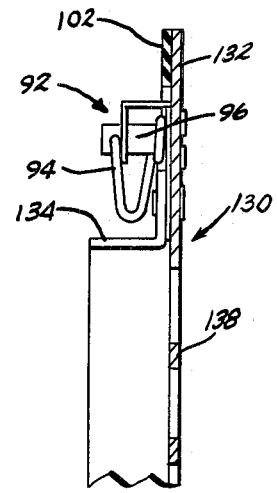
FIG. 8 is an enlarged, fragmentary, sectional view taken generally along line VIII—VIII of FIG. 6 and illustrating a portion of the protective grill assembly.
Figure 6:
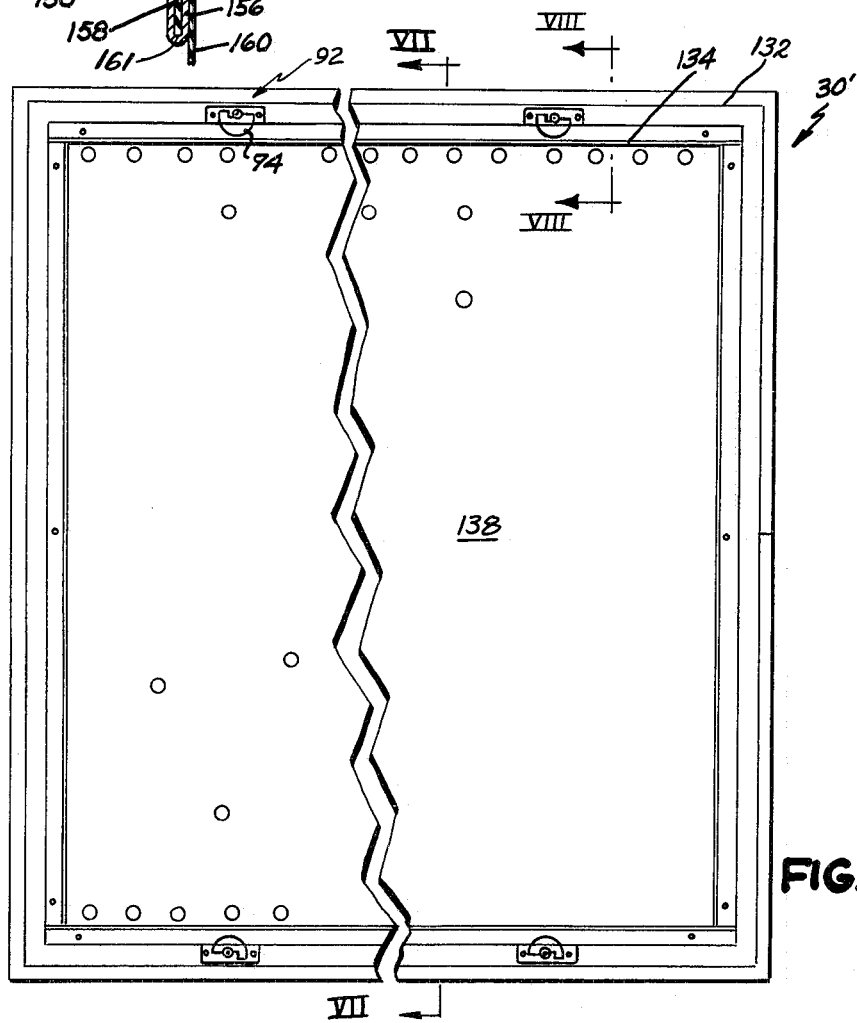
FIG. 6 is a top, plan view of the protective grill assembly incorporated in the present invention.

The grill assembly 30 illustrated in FIGS. 3 and 4 includes a rectangular frame or panel 84 having a horizontal portion 86 and an upwardly directed or upturned skirt or flange 88. Portion 86 extends generally perpendicular to skirt 88 and horizontal portion 86 is joined to the upturned skirt 88. The lower surface 89 of the filter frame 26 is provided with another resilient gasket 90 extending around the entire periphery. A plurality of spring latch or locking mechanisms 92 are carried by the horizontal portion 86 of the frame 84 (FIGS. 6 and 8). Each latch 92 includes a wire 94 secured at its ends to a bolt or turnable rod 96. The latches or locking means 92 are positioned and the frame 84 is dimensioned so that the latch may effectively clamp the lower horizontal flange 46 of the filter housing to the ceiling gridwork 80. A gasket 100 is secured along the entire outer or lower peripheral surface 101 of the flange 46 of housing 16. A gasket 102 is secured to frame 84 adjacent the outer peripheral edge of the horizontal portion 86 of the frame 84. Gaskets 100 and 102 are compressible and define bottom seals or seal strips. When the housing 16 is disposed on the gridwork 80, the frame 84 is positioned against the gridwork and the latch means clamps and seals the housing to the gridwork. The gaskets 100, 102 are uniformly compressed thereby defining an effective seal. Also, the upturned lip or skirt 88 of the frame is pressed into engagement with the lower resilient gasket 90 carried by the filter frame 26 thereby defining another knife edge seal. Latches 92 other than those illustrated could be used to clamp the grill panel or frame to the housing.

This mounting arrangement, therefore, defines with the filter panel, the gaskets 70 and 90, the filter housing and the frame 84 a sealed, enclosed, annular dead air space 106. The filter panel may be easily removed and installed within the diffuser unit 10 while providing an effective annular seal to prevent contamination. In the embodiment illustrated in FIGS. 3 and 4, a perforated grill 110 having apertures 111 is carried by the frame 84 so as to define a restrictive space 115. A plurality of bolts 112 extend through apertures formed in the frame adjacent the skirt 88 and are threaded to nuts 113. The bolts 112 extend through suitable apertures formed in the perforated grill 110. Coil springs 116 (schematically shown) are disposed between the frame 84 and the grill 110 to bias the grill 110 outwardly against the head of the bolt 112 so that the grill is supported in a rattle-free manner. Other means could, of course, be used to support the grill 110 in a manner spaced from the filter housing.

The peripheral edge 109 of the perforated grill 110 is angled upwardly at an angle of approximately 30°. Since the grill 110 is spaced from the frame 84 and also from the lower surface of the filter panel, part of the air passing downwardly through the filter and grill will be dispersed sideways by the resistance of the grill. This sideways and downward dispersal of the filtered air creates a higher mix between the room air and the supply air than would be obtained without the grill. The upturned edge of the grill 110 increases this mixing action and radial dispersal of the air prevents the occurrence of vertical shafts of cool air extending from the ceiling to the floor due to the basic laminar flow air pattern established by the filter. This will be most pronounced when the air supplied to the duct and plenum is considerably cooler than the room air. The radial dispersal eliminates the need to install for the prevention of this problem, more diffuser units than are actually needed. Due to the low velocity of the air leaving the filter, a conventional distributor such as used in standard air conditioning systems will not perform satisfactorily. The perforated panel or grill 110 having the upturned edge and the vertical spacing of the panel from the filter, however, provide the required radial disperal and mixing to prevent forming of the vertical cool air shafts. The grill, therefore, results in greater economy due to reduced initial cost and operating cost. The grill 110 is employed in non Class 100 applications where the units 10 are widely dispersed and the vertical random air currents exist. For example, the grill 110 is used when the units 10 are employed to filter the control air supplied to a hospital room.

Figure 7:
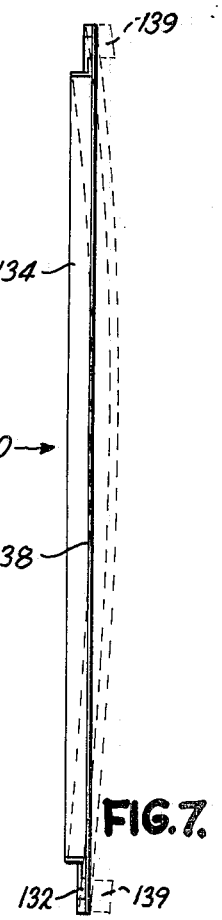
FIG. 7 is a cross-sectional view taken generally along line VII—VII of FIG. 6.

In the embodiment illustrated in FIGS. 5–8, the protective grill means 30' includes a rectangular, perforated panel or frame 130. The panel 130 defines a perforated area 138 and an imperforate border or horizontal flange 132. An upwardly directed skirt 134 is carried by the panel 130. As with the previous embodiment, the panel 130 and the skirt 134 are dimensioned to clamp and positively lock the filter housing 16 to the ceiling gridwork 80 and also define a knife edge seal with the lower, resilient gasket 90. In the preferred construction, the upstanding skirt 134 is defined by a plurality of angle pieces (FIG. 6) which are riveted or otherwise suitably secured to the panel 130. Also during fabrication, the panel 130 is normally bowed downwardly relative to the upper surface thereof to facilitate proper gasket seal when in use. The assembly is supported adjacent its ends on blocks and a protective cover is placed in the center. Downward pressure is applied to the cover until an approximately ½ inch longitudinal bow results. This is schematically illustrated in FIG. 7 with the blocks designated 139 and the bowing being purposely exaggerated. The ½ inch bow is not readily illustrated. The gasket material defining the bottom seal 102 is attached around the imperforate border of the panel 130 and may be of a conventional, adhesive-backed gasket material.

When mounting the diffuser in the ceiling, the housing, as shown in FIG. 5, is rested on the inverted T-bar gridwork, a spacer 140 may be positioned between the vertical portion of the gridwork and the housing sidewall. A screw passing through the gridwork, the spacer and the housing may be employed to secure the housing in place. Typically, however, the diffuser will merely rest on the gridwork and be held by the grill assembly. The grill assembly eliminates the need for such additional fasteners. Also, the grill assembly by virtue of the spring latches 92 clamps, locks and seals the diffuser unit in place.

As shown in FIG. 5, provision is made for suspending a plastic isolation curtain around the entire periphery of the diffuser unit. An angled, curtain support member 150 positioned around the frame includes a vertical leg 152 and a horizontal leg 154. The member 150 is therefore L-shaped in cross section. The horizontal leg 154 is clamped between the grill edge 132 and the ceiling gridwork and rests on bottom seal 102. A sealing gasket 162 of the adhesive backed type is preferably secured to the upper surface of the horizontal flange portion 154. The vertical leg 152 is turned upon itself to form an upstanding lip 156 which defines an elongated groove or channel 158. An isolation curtain 160 has its upper lateral edge 161 disposed within the groove 158. Since the member 158 is clamped and sealed by the grill assembly 30' and the edge of the curtain 160 is received within the groove 158 so as to be doubled back or turned on itself, an effective seal is provided between the ceiling and the isolation curtain. This seal prevents aspirating of room or plant air into the clean air area. The angle, L-shaped curtain support member 150 is preferably fabricated as an elongated strip. V-shaped notches are cut into the horizontal portion 154 in the field to permit the member to be bent to define angles when assembled. The member, therefore, permits effective enclosure of a production area since the member may be clamped between the grillwork or grill assembly of adjacent diffuser units along the sides thereof.

In use, the diffuser unit and the filter housing 16 are positioned within the ceiling so that the lower flange of the filter housing is resting on the T-bar. The clamp brackets 54 are positioned on the filter panel frame 26 and the resilient foam gaskets 70, 90 are secured to the frame. Rods 52 are passed through the springs 68 and the brackets 54 and the panel is installed within the housing by threading the rods into the brackets 48. Next, the grill assembly 30 or 30' is positioned against the ceiling gridwork. The latches 92 are turned so that the wires 94 clamp, latch and lock the housing to the ceiling gridwork and hence the housing to the panel. A complete seal of the annular area defined by the filter frame and the filter housing is therefore provided.

The grills are preferably fabricated from anodized aluminum and are easily removable and also seal off the annular void between the filter housing and the filter panel to prevent induced contamination. In the preferred construction of the embodiment illustrated in FIG. 5, the grill is perforated for a 65% open area and approximately 1 inch of unpunched border is left. The angle pieces defining the skirt 134 are fabricated from aluminum and are riveted and sealed to the solid and imperforate border 132 which surrounds the perforated area 138 of panel 130 of the grill. A minimum of four flush-mounted spring-loaded fasteners 92 are mounted in the solid border area 132 of the grill. These fasteners may be rotated with a screwdriver over the base or the lower flange 46 of the filter housing thereby locking the grill in place. The upper and lower gaskets 70 and 90 are preferably foam vinyl gaskets. A material which has been found to be acceptable and is presently preferred is #748 PVC Foam with acrylic adhesive-PSA. This gasket material is adhesive backed on one side for securement to the frame. The grill assembly and latches 92 draw the gaskets 102 or 162 if the curtain support member is employed, against the bottom of the inverted T-bar gridwork to produce an induction-proof seal.

In some applications, the diffuser unit 10 would be individually suspended and not disposed on a ceiling gridwork. In such applications, the grill assemblies 30 or 30' will draw the sealing gaskets or bottom gaskets 100, 102 and/or 162 into engagement with the lower flange 46 of the filter housing.

The unique filter mount and seal in accordance with the present invention prevents contamination of the area above the ceiling or aspiration of contamination from this area to the clean room area while providing an easily and readily replaceable ceiling filter. The unit is easily manufactured and easily installed in the field. In view of the above description, various modifications will undoubtedly now become apparent to those of ordinary skill which would not depart from the inventive concepts disclosed herein. For example, the housing 16 could be fabricated as an integral unit with the diverging portion of the diffuser unit. The primary consideration is to provide an effective seal along the upper peripheral surface of the filter panel and the lower peripheral surface as well as effectively enclose the annular area between the filter panel and the housing. The knife edge seals which compress the foam gaskets prevent transfer of chemical biohazardous substances to this dead air space area. The filters may be easily replaced in the field without the need for breaking up the ceiling structure. With either embodiment, all that is necessary is to turn the spring-loaded latches, drop the grill assembly, and back out the rods 52 which are carried by the bracket 48. It is expressly intended, therefore, that the above description should be considered as that of the preferred embodiments. The true spirit and scope of the present invention will be determined by reference to the appended claims.

The embodiments of the invention in which an exclusive property or privilege is claimed are defined as follows.

1. An improved diffuser unit supportable on a ceiling gridwork, for supplying filtered air to a clean work area, said unit comprising:
a plenum having a stack connectable to a source of air and a diverging section;
a filter housing carried by said diverging section and having sidewalls joined by end walls, a downturned lip connected to and spaced from said sidewalls and said end walls and a lower horizontal flange connected to said sidewalls and said end walls adapted to rest on the ceiling gridwork;
a filter panel having an upper and lower surface;
a first, resilient gasket extending around the periphery of said upper surface of said panel;
a second, resilient gasket extending around the periphery of said lower surface of said panel;
a plurality of adjustable, resilient clamp means operatively engaging said housing and said filter panel for supporting said filter panel and clamping said first gasket into sealing engagement with said downturned lip; and
a locking and sealing device disposed so as to engage said second, resilient gasket and said lower horizontal flange of said filter housing for sealing the interior of said filter housing by defining a seal with said second resilient gasket.

2. A diffuser unit as defined by claim 1 wherein said locking and sealing device comprises: a frame, said frame having an upward skirt engaging said second, resilient gasket in a knife edge seal, a generally horizontal portion joined to said skirt and extending generally perpendicular thereto, and a plurality of latch means carried by said frame on said horizontal portion for clamping a portion of the frame to said housing lower horizontal flange.

3. A diffuser unit as defined by claim 2 wherein said locking and sealing device further includes a perforated grill secured to said frame, a peripheral edge portion of said grill being angled upwardly with respect to the remainder of said grill to partially disperse air sideways relative to said diffuser unit.

4. A diffuser unit as defined by claim 2 further including first and second bottom seals, one engaging said frame and the other engaging said housing lower horizontal flange for sealing the area where said housing horizontal flange is clamped to the ceiling gridwork, said latch means adapted to uniformly compress said bottom seals whereby in conjunction with said first and second gaskets ingress of contamination into or from the area around said plenum is prevented.

5. A diffuser unit as defined by claim 4 further including a generally L-shaped in section, continuous, curtain support member extending around the entire periphery of said frame and having a portion resting on one of said bottom seals, said curtain support member including an upturned, peripheral lip defining a channel; and a protective curtain having an edge disposed within said channel.

6. A diffuser unit as defined by claim 5 wherein each of said adjustable, resilient clamp means comprises:
a bracket carried by said housing;
an adjustably positionable rod carried by said bracket;
a support bracket secured to said filter panel and through which said rod extends; and
means on said rod and engaging said support bracket for biasing said filter panel and said first gasket upwardly into sealing engagement with said downturned lip to thereby define a knife edge seal.

7. A diffuser unit as defined by claim 4 wherein each of said adjustable, resilient clamp means comprises:
a bracket carried by said housing;
an axially adjustably positionable rod carried by said bracket;
a support bracket secured to said filter panel and through which said rod extends; and
means on said rod and engaging said support bracket for biasing said filter panel and said first gasket upwardly into sealing engagement with said downturned lip to thereby define a knife edge seal and wherein a plurality of stops are secured to said filter panel which are dimensioned to engage said housing and limit upward movement of said filter panel and prevent over compression of said first gasket.

8. A protective grill assembly for use with a diffuser unit of the type including a filter housing, a filter panel supported within said housing and having a resilient gasket extending around the periphery of a lower surface thereof, said diffuser unit adapted to rest on a ceiling gridwork, said grill assembly comprising:
a frame having a horizontal portion, said horizontal portion having an upper surface and an outer edge and an upturned skirt spaced from said outer edge of said horizontal portion, said skirt adapted to form a knife edge seal with said filter panel resilient gasket;
a plurality of latches positioned at opposed points around said frame on said horizontal portion for clamping the frame to the ceiling gridwork; and
a seal strip secured to the upper surface of the horizontal portion of said frame, said frame being normally bowed downwardly to facilitate sealing engagement of said skirt with said filter housing resilient gasket and said frame comprises a rectangular panel having an imperforate border area defining said horizontal portion and a perforated grill area; and
a curtain support member positioned around said frame for sealingly supporting a curtain and wherein said curtain support member comprises an angled member having a horizontal leg and a vertical leg in section, said horizontal leg resting on said frame.

9. A protective grill assembly as defined by claim 8 wherein said vertical leg of said curtain support member is reverse bent to define an upturned lip, said vertical leg of said curtain support member defining a curtain receipt channel.

10. A protective grill assembly as defined by claim 9 wherein said curtain is a plastic curtain having an upper edge disposed entirely with said curtain receipt channel.

11. An improved diffuser unit for supplying clean air to a work area, said unit being of the type including a downwardly opening hood, a filter housing extending around the periphery of said hood and dimensioned to rest on a ceiling support gridwork, and a filter panel having upper and lower peripheral surfaces and being disposed within said filter housing, wherein the improvement comprises:
a first sealing gasket extending all the way around the upper peripheral surface of said filter panel;
a second sealing gasket extending all the way around the lower peripheral surface of said filter panel;
resilient support and clamping means secured to said filter housing and engaging said filter panel for supporting said filter panel within said housing, said housing including a downturned flange extending therearound, said support and clamping means biasing said first gasket into engagement with said downturned flange to thereby define a knife edge seal; and
grill means sealingly engaging said housing for defining a knife edge seal with said second sealing gasket and thereby defining a sealed annulus with said filter housing and said filter panel.

12. An improved diffuser unit as defined by claim 11 wherein said grill means comprises:
a normally downwardly bowed, perforated panel having an imperforate border;
an upwardly directed skirt extending around said perforated panel in spaced relationship with the edge thereof;
a bottom seal carried on the upper surface of said imperforate border of said perforated panel; and
a plurality of spaced, latch means mounted to said perforated panel around said border for clamping and locking said perforated panel to said filter housing, said upwardly directed skirt and said panel dimensioned to define said knife edge seal with said second sealing gasket to thereby define a sealed annulus with said filter housing and said filter panel.

13. An improved diffuser unit as defined by claim 12 wherein said resilient support and clamping means comprises:
a bracket strap carried by said filter housing;
a support bracket engaging said filter panel; and
resiliently biasing means operatively connecting said support bracket to said bracket strap for resiliently biasing said support bracket towards said downturned flange so that said first sealing gasket defines said knife edge seal with said downturned flange.

14. An improved diffuser unit as defined by claim 13 further including:
an angled, curtain support member extending from and around said imperforate border and defining a curtain groove;
a plastic curtain having an edge extending continuously within said groove; and
a seal secured to said angled curtain support memeber.

15. An improved diffuser unit as defined by claim 14 wherein said means for resiliently biasing said support bracket towards said downturned flange comprises:
a headed rod threadably engaging said bracket strap; and
means carried by said rod and engaging said support bracket for biasing said support bracket towards said downturned flange.

16. An improved diffuser unit as defined by claim 12 further including:
an angled curtain support member extending from and around said imperforate border and defining a curtain groove;
a plastic curtain having an edge extending continuously within said groove; and
a bottom seal secured to said angled curtain support member.

* * * * *